Patented July 7, 1931

1,813,452

UNITED STATES PATENT OFFICE

GEORGE D. KING, OF CHICAGO, ILLINOIS, AND FRED J. GOUGH, OF FORT DODGE, IOWA, ASSIGNORS TO UNITED STATES GYPSUM CO., OF CHICAGO, ILLINOIS, A CORPORATION OF ILLINOIS

GYPSUM CONCRETE

No Drawing.  Application filed September 23, 1927. Serial No. 221,610.

This invention relates to a new composition of matter, of fireproof properties, which consists of a prepared dry gypsum concrete, or dry plaster mortar, i. e., a mixture of calcined and uncalcined gypsum rock in graded finenesses, constituting a prepared dry gypsum concrete adapted to be rendered plastic with water and poured or troweled in place,—and the process of manufacturing the same.

The use of aggregate with cements to form mortars and concretes is common. Sand, gravel, cinders, stone, wood fibre, etc. are commonly used as being the most readily available. However, the use of such aggregates results usually in a marked decrease in strength in the resulting set and hardened concrete. While it is well known that the cement-water ratio in preparing wet concrete mixes is perhaps the most important strength factor, yet the lack of a natural bond or adhesive state between the aggregate used and the cementing material plays an important part even if not always appreciated. In general, aggregates that are somewhat open and porous, with absorbent properties give stronger concretes than aggregates which are dense and non-absorbent. In the case of calcined gypsum cement, the addition of non-absorbent sand weakens the mortar's ultimate strength materially when set and hardened with water, while a porous aggregate like calcined clay does not weaken it so much, although as an aggregate it is much weaker than sand. It is, therefore, desirable, and especially with calcined gypsum, to use an aggregate of such nature that it is somewhat absorbent and thus there is increased bond between it and the cementing agent.

It has been suggested by Le Chatelier that if the aggregate is akin in nature to the cementing material, a natural bond will be likely to result between the aggregate and the cement and little or no decrease in strength will be obtained by using an aggregate of this character. In the case of gypsum concrete, this would mean the use of gypsum rock with calcined gypsum as the cementing agent. However, this has been impractical heretofore due to the fact that the natural raw gypsum rock has an accelerating effect on the set of the calcined gypsum, making its use as a cementing agent impossible in such concrete mixes because of this fast accelerated set and hardening when wet and plastic preventing job working. It is our object to produce a gypsum product in which the aggregate is a gypsum rock, which has been so treated that its accelerating action on calcined gypsum or plaster of Paris is neutralized and destroyed. Another object is to decrease the production cost of calcined gypsum for use as a cement in such concrete by eliminating a portion of the grinding, calcining and drying costs. In addition, our product provides denser set and hardened concrete with lower water absorption, because of the low consistency and cement water ratio capacity of our new prepared dry concrete. In practicing our invention, we may carry it out in two ways depending upon the particular production facilities as they may be encountered in varying locations.

(1) In this method, the crushing, screening and grading of the raw gypsum rock includes the elimination of the dust or very fine powdered material. This dust is sent to the raw feed for calcined gypsum or plaster of Paris production while the graded crushed rock with the fines eliminated is then partially calcined to convert the surface of the rock to calcined gypsum without separating this surface calcined portion from the inner non-calcined raw portion of the gypsum rock. In other words, the gypsum rock aggregate is calcined only on its surface to convert it to plaster of Paris and thus render it non-accelerating. This aggregate is then mixed with powdered calcined gypsum previously prepared, in the desired proportions to form a dry mixed gypsum concrete.

(2) This method is generally preferable when a quantity of production is needed since it offers greater manufacturing economy. It differs from the previous method in that both the calcined gypsum cement and gypsum aggregate are prepared at the same time and thus the final mixing of the two separate productions is eliminated, which also reduces cost. In this method rotary calciners are used and are operated upon raw material containing fines in sufficient ratio to graded aggregate sizes of the gypsum rock so that this composite output from the calciner may be used directly, sufficient plaster of Paris being formed from the fines during calcination to supply adequate cement. If it is desirable to produce a product having relatively coarse aggregate it is preferable to use two crushing operations. One operation produces smaller amounts of coarse aggregate and a larger amount of fines, of gypsum rock, and the other crushing operation produces a larger amount of coarse crushed gypsum rock with a minimum amount of finer material. The output of these two crushing operations or similar graded operation if one crusher is used, feeds in a common stream to the rotary calciner. If the calciner is run at properly regulated speed and temperature, complete calcination of both the coarser gypsum rock and the finer particles will be obtained but this of course is not desirable. However, the desired calcination can be maintained by operating at the correct speed and temperature and when so maintained, the finer particles will be completely calcined to calcined gypsum or plaster of Paris but the larger and coarser particles of gypsum rock will be calcined only on their surfaces and this surface calcination renders them non-accelerating to thoroughly calcined gypsum, when the two are mixed and reduced to a plastic state with water.

The surface calcination of the coarse rock by either of these methods prevents the treated gypsum rock aggregate from accelerating, because the dihydrate form of gypsum, which is the natural gypsum rock present in the interior of the coarser particles, is completely surrounded by the hemihydrate form of calcium sulphate which is calcined gypsum or plaster of Paris. Thus, the surface of the aggregate is a similar material to the cementing agent, therefore non-accelerating, and a better nautral bond is afforded. Also, this treated gypsum rock aggregate is somewhat absorbent and thus the "hemihydrate" calcined gypsum cement mingles with like "hemihydrate" coating the surfaces of the aggregate, and the two intermingle and set and harden together, as they are both converted to the "dihydrate stage" of the calcium sulphate water system. Also, such material will require less water for mixing to a workable consistency and, therefore, will yield a denser concrete. This denser gypsum concrete then, since the gypsum rock aggregate contains two molecules of water and the calcined gypsum sets and picks up water to approximate the two molecule dihydrate ratio again, is a very valuable fireproofing agent, because of this high content of combined water. So steel and other structural members can be fireproofed by covering or surrounding with this type of prepared gypsum concrete, with very great economy because it requires considerably less amount of such fireproof concrete to give adequate protection to the structural members because of this high combined water content.

Having thus described our invention what we claim is:

1. A dry mixed gypsum product adapted to be rendered plastic and to harden with water, comprising a mixture of powdered calcined gypsum with a coarser raw gypsum rock aggregate the surface of which is calcined to plaster of Paris.

2. The process of producing gypsum concrete which comprises calcining a mixture of finely and coarsely ground gypsum rock to a predetermined extent, so that the finer particles of rock are calcined to plaster of Paris, and the coarser particles have uncalcined gypsum centers and a coating of plaster of Paris.

GEORGE D. KING.
FRED J. GOUGH.